(12) United States Patent
Horikawa

(10) Patent No.: US 6,918,828 B2
(45) Date of Patent: Jul. 19, 2005

(54) GAME SYSTEM, PERIPHERAL DEVICE THEREOF, CONTROL METHOD OF GAME SYSTEM, AND RECORD MEDIUM

(75) Inventor: Kentaro Horikawa, Hokkado (JP)

(73) Assignee: Konami Corporation (JP)

( * ) Notice: Subject to any disclaimer, the term of this patent is extended or adjusted under 35 U.S.C. 154(b) by 216 days.

(21) Appl. No.: 09/752,007

(22) Filed: Dec. 28, 2000

(65) Prior Publication Data

US 2001/0007827 A1 Jul. 12, 2001

(30) Foreign Application Priority Data

Jan. 12, 2000 (JP) ........................................ 2000-006377

(51) Int. Cl.⁷ ................................................ A63F 13/12
(52) U.S. Cl. ............................ 463/1; 463/42; 463/43; 709/203; 709/212; 709/218
(58) Field of Search ................. 463/1, 16–20, 463/22–23, 25, 29, 42–43; 273/138.1, 143 R, 148 B, 459–460; 709/203, 212, 218; 712/31

(56) References Cited

U.S. PATENT DOCUMENTS

| | | | |
|---|---|---|---|
| 5,603,659 A | * 2/1997 | Okada .......................... | 463/25 |
| 5,761,647 A | 6/1998 | Boushy | |
| 6,009,458 A | * 12/1999 | Hawkins et al. ............ | 709/203 |
| 6,110,043 A | * 8/2000 | Olsen .......................... | 463/27 |
| 6,165,071 A | * 12/2000 | Weiss .......................... | 463/24 |
| 6,241,608 B1 | * 6/2001 | Torango ...................... | 463/27 |

2002/0032059 A1 * 3/2002 Sugimara ..................... 463/43

FOREIGN PATENT DOCUMENTS

EP       0 918 298 A      5/1999

OTHER PUBLICATIONS

Patent Abstracts of Japan Publication No. 04–187170 entitled Control Equipment for Game Hall, By Shohachi Ugawa, published Jul. 3, 1992.
Patent Abstracts of Japan Publication No. 11–007504 entitled Memory Card Device and Video Game Device, By Akihiro Sugimura, published Jan. 12, 1999.
Patent Abstracts of Japan Publication No. 08–332282 entitled Using Method for Game Device IC Card, Image Synthesizing Method, and Game Device, By Toya et al., published Dec. 17, 1996.

* cited by examiner

*Primary Examiner*—Scott E. Jones
(74) *Attorney, Agent, or Firm*—Bachman & LaPointe, P.C.

(57) ABSTRACT

A game system comprises game execution apparatus to execute a game adapted to utilize a predetermined pseudovalue based on a game program, a memory card device, which records a pseudovalue obtained as a result of executing the game as a game data, and data reading apparatus to extract the pseudovalue from the game data recorded on the memory card device and transmit the extracted pseudovalue to the game execution apparatus. The memory card device comprises a record medium which is adapted to record the pseudovalue for each of a plurality of kind of the game, communication apparatus to communicate between another memory card device, and a control apparatus.

17 Claims, 10 Drawing Sheets

GAME SYSTEM, PERIPHERAL DEVICE THEREOF, CONTROL METHOD OF GAME SYSTEM, AND RECORD MEDIUM

BACKGROUND OF THE INVENTION

1. Field of the Invention

The present invention relates to a game system, which generates a money value (hereinafter, called as a "pseudovalue"), for example, such as a mah-jong game and a pachinko game, especially, to a technique, which secures a sharing of the above-mentioned pseudovalue between different games and becomes exchangeable mutually.

2. Description of the Related Art

In a game system, it becomes general to present an execution result of a game by a pseudovalue as a motivation of the game of a player. The pseudovalue is an acquisition point by knocking down an enemy character if it is a shooting game, a result if it is a board game and a mah-jong game, and exerts a value in a corresponding game. For example, the player can buy goods, equipments, and items, etc. by using the pseudovalue (acquisition point) acquired through a hero character while playing a game. A name of the player, who acquires the highest point in a certain game, is usually recorded with the acquisition point. In a game, which requires a long time until game ends once such as an adventure game and a role-playing game, parameters and items etc. of the hero character, to which the player operates until that time when the game is interrupted, is saved to the memory card device etc. as data to reproduce a state when the game is interrupted (this data is called as a "saved data") and the above-mentioned pseudovalue may be included in this saved data.

The pseudovalue has a meaning only in a game, which can utilize it, in this conventional kind of the game system. In a word, the pseudovalue can be used only an the game, in which the pseudovalue is acquired. Therefore, if the kind of the game is different, the acquired pseudovalue cannot be used. Therefore, when the player acquires a value in a certain game, the motivation, which continuously performs the corresponding game, becomes cooled down.

SUMMARY OF THE INVENTION

A main object of the present invention is to provide a game system and a peripheral device, which becomes possible to use a pseudovalue generated in a certain game in other kinds of games.

Another object of the present invention is to provide a game execution method to share one pseudovalue by a plurality of games, and a record medium, which becomes suitable to execute this method on a computer.

A game system according to the present invention comprises: game execution means to execute a game, which treats a predetermined pseudovalue based on a game program; a record medium, which records the pseudovalue obtained as a result of an execution of said game; and data reading means to extract said pseudovalue from the game data recorded on said record medium or other similar kinds of record media and lead it to said game execution means, and said pseudovalue can be shared between other kinds of the games, which treat the corresponding pseudovalue, and said game.

The following various modes can be used as the pseudovalue according to the kind of the game. For example, a score, which indicates a result of the game, corresponds to the pseudovalue if it is a mah-jong game and a pachinko game, etc. The acquisition point by knocking down an enemy character corresponds to the pseudovalue if it is a shooting game etc. A pseudomoney, which is required by a hero character as a result of the game execution, corresponds to the pseudovalue in an adventure game and a role-playing game, etc.

It is possible to indicate by this pseudovalue as a numerical value which can compare a superiority or an inferiority of the play result by the play person (hereinafter, called as a "player") who operates this game system, furthermore, this pseudovalue can be used as a constant value which can be exchanged. In the above-mentioned example, the specific goods and the items can be bought and acquired by the pseudovalue in the game space according to the pseudomoney, and the procedure of the game execution can be selectively changed according to the value of the pseudovalue at that time.

The pseudovalue can be used by converting (changing) into one of appropriate values according to the kind of the games. This can be achieved by constructing the above-mentioned game execution means so as to hold the parameter, which indicates a relative standard of value of the predetermined pseudovalue of each kind of the game and decide the standard of value of the pseudovalue based on the parameter according to the kind of the game to be executed. With this configuration, it becomes possible to use one pseudovalue as a common standard of value regardless of the kind of the game.

Another game system according to the present invention comprises: game execution means as mentioned-above; a record medium to record the pseudovalue obtained execution result of the game and a parameter which determines a relative standard of value of the predetermined pseudovalue for each kind of the games; and data read means to read the pseudovalue and the parameter recorded on said record medium and other similar kinds of the record media, and said pseudovalue can be shared by said game and other kinds of games which treat the corresponding pseudovalue.

The record medium may be provided like a semiconductor memory such as a RAM and a ROM fixedly provided in the game system, and may be provided detachably from the game system like other portable disks such as optical disks of a flexible disk, a magnetic disk, and a CD-ROM etc. and a magnet-optical disk and may exchangeably be provided to other devices. The record medium may be comprised to an external information processing device connected with the game system through communication means.

By using the exchangeable portable disk and the record medium of the external information processing device, it is preferable to perform valid use of the pseudovalue in a state of getting away timely or spatially. In a word, since it becomes possible to use the pseudovalue obtained as the result of the execution of a certain game in other kinds of games, it becomes possible to achieve the valid use of the pseudovalue.

The memory card device, which is exchangeably fitted, may be used as the record medium.

This memory card device comprises communication means to communicate between another similar kinds of devices (it may be a memory card device and may be an information processing device with the similar kind of function), and control means to transmit the data recorded on the record medium through said communication means to the other similar kinds of devices and record the data received from the corresponding similar kind of devices through said communication means on said record medium.

Said control means transmits a part of the data recorded on its own record medium to said other similar kinds of devices and subtracts the value of the transmitted data from the value of the data before transmission.

On the other hand, said control means adds the value, to which the received data shows, to the value of the data, which is recorded on its own record medium, before reception, when receiving the data, which is transmitted from said other similar kinds of devices. "DATA" in this case is the above-mentioned pseudovalue, or a pseudovalue and a parameter.

The communication means in the memory card device may be a cable or a wireless. For example, communication means may comprise an infrared communication device which comprises an infrared light emitting diode, an ultrasonic communication device which comprises an ultrasonic transmitting and receiving part, a communication device which comprises an antenna etc. and transmits and receives in a form of an electric wave, and a communication device to transmit and receive a string of an electric signal with the communication cable.

Exclusive power supply means may be comprised from the viewpoint of stabilizing the operation of the memory card device. It can be constructed to comprise program means, which can define the processing of its own device exclusively apart from the above-mentioned game program.

Another game system according to the present invention comprises: game execution means to execute the game, which treats a predetermined pseudovalue based on a game program; a record medium, which records the saved data to reproduce the game execution environment at the time of the end of the game, which includes the pseudovalue obtained as a result of the execution of said game; and data reading means which reads and leads the saved data recorded on said record medium, or, other same kind of record media to said game execution means, and said pseudovalue can be shared by said game and other kinds of the games, which treats the corresponding pseudovalue, and said game execution means is constructed to construct the game execution environment based on the saved data to be read and continuously execute said game by using the pseudovalue, which is included in the corresponding saved data. The saved data is the data to leave an execution result of the game as a history data, and in general, includes data, which shows a reached level and/or stage in the corresponding game, as a result such that the player executes the game, or a process of the game execution. Furthermore, the saved data includes the parameter, which shows a characteristic of the game character, in which an operation procedure is defined by the character and the game execution means, which are operated by the player. The above-mentioned pseudovalue may be considered as a kind of the saved data if it is classified as the execution result of the game.

Another game system according to the present invention comprises: game execution means to execute a game, which treats a pseudovalue based on a game program recorded on the disk exchangeably fitted thereto; a memory card device which is a device accommodating a record medium, which can record the pseudovalue for a plurality of kinds of the games, and exchangeably fitted, and records the pseudovalue obtained by executing the game based on the game program recorded on said disk in said record medium according to the kind of the corresponding game; and data reading means to read the pseudovalue recorded on said record medium of said fitted memory card device according to the kind of the game to be executed and lead it to said game execution means, and a pseudovalue for a certain game recorded on said record medium is converted into a pseudovalue for other kinds of the games to rerecords a converted pseudovalue on the corresponding record medium.

The memory card device in this game system is constructed to convert a part of the pseudovalue for one game recorded on said record medium into the pseudovalue for the other kinds of games and the rerecord to the corresponding record medium.

The present invention provides a memory card device exchangeably fitted to the game system, which comprises the game execution means to execute the game which treats the predetermined pseudovalue based on the game program.

This memory card device comprises: communication means to communicate between other similar kinds of devices (may be a memory card device or may be an information processing device having a similar function); a record medium to record data; data record means to record a pseudovalue obtained as a result of an execution of said game, when its own device is fitted in said game system, on said record medium according to the kind of the game; and control means to record the pseudovalue, which transmits the pseudovalue recorded on said record medium to said other similar kind of devices through said communication means and is received from said other similar kinds of devices through said communication means on said record medium.

The communication means in the memory card device is the device as specifically described in the configuration of the game system, desirably performs the wireless communication and it may be a cable or a wireless. That is, control means is constructed to transmit a part of the pseudovalue recorded on its own record medium, that is, only the required pseudovalue to other similar kinds of devices and subtract the pseudovalue, which has been transmitted, from the pseudovalue before transmission. On the other hand, control means is constructed to add the received pseudovalue to the pseudovalue, which is recorded on its own record medium before reception when receiving the pseudovalue, which is transmitted from the other similar kinds of devices.

As mentioned above, it may be constructed to comprise program means, which is possible to exclusively and independently define the processing of the device to the game system, in which the device is fitted.

More preferably, the memory card device is constructed to further comprise display means to be able to check visually and to display the content of the execution of the game based on said game program and pronunciation means to generate a sound based on the sound data.

All of or a part of the pseudovalue recorded on the record medium of a certain memory card device can be transmitted to another similar kinds of devices by using the communication means and the control means if necessary when such a memory card device is used. The memory card device, which receives the pseudovalue, records the pseudovalue by the readable configuration to its own record medium at any time, and can execute the game by using this by the game execution means. As a result, it becomes possible to mutually use the game data etc., which include the pseudovalue between different memory card devices.

A game execution method according to the present invention comprises: recording said pseudovalue obtained by a game system having game execution means to execute the game, which treats a predetermined pseudovalue based on a game program on a record medium detachably fitted to said game system according to kinds of the games; converting one pseudovalue for the game into a pseudovalue for other kinds of the games and rerecording it on the corresponding record medium; and sharing one pseudovalue by a plurality of kinds of the games by reading the pseudovalue corresponding to the kind of the game, which should be executed, from said record medium and leading it to said game execution means.

By the way, a difference in difficulty of the acquisition of the pseudovalue might be occurred if the kind of the game executed by the game execution means is different. This is the reason why the method of giving the pseudovalue is left to an individual arbitrariness for the game, and the characteristic of the game is ruined by unifying them. However, the pseudovalue recorded on the record medium cannot forecast whether to be used for any other games when recording. Then, when the game is executed, the parameter, which indicates a relative standard of value of the predetermined pseudovalue of each kind of the games is held in the game system or the record medium in the present invention. The standard of value of the pseudovalue is decided based on said parameter according to the kind of the game, which should be executed.

An article of manufacture according to the present invention comprises: a computer usable medium having computer readable program code means embodied therein for causing a computer, which comprises game execution means, which executes the game, which treats a predetermined pseudovalue based on a game program and a record medium to record data, executing the game, the computer readable program code means in said article of manufacture comprising:

(1) Computer readable program code means for a computer to record the pseudovalue based on an execution result of said game in said record medium according to the kind of the games;

(2) Computer readable program code means for a computer to convert one pseudovalue for the game into a pseudovalue for other kinds of the games and rerecord in corresponding record medium; and (3) Computer readable program code means for a computer to read the pseudovalue corresponding to the kind of the game, which should be executed from said record medium, to lead to said game execution means, and to execute the game, which uses the pseudovalue.

It is preferable said game program is packed together as a part of said program code and is detachably constructed from said computer.

As is clear from the above-mentioned explanation, according to the present invention, it becomes possible to perform the valid use of the execution result of the game by exceeding the kind of the game, since the pseudovalue obtained by executing a certain game can be used to other kinds of games.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DESCRIPTION OF THE PREFERRED EMBODIMENT

Figure 1:
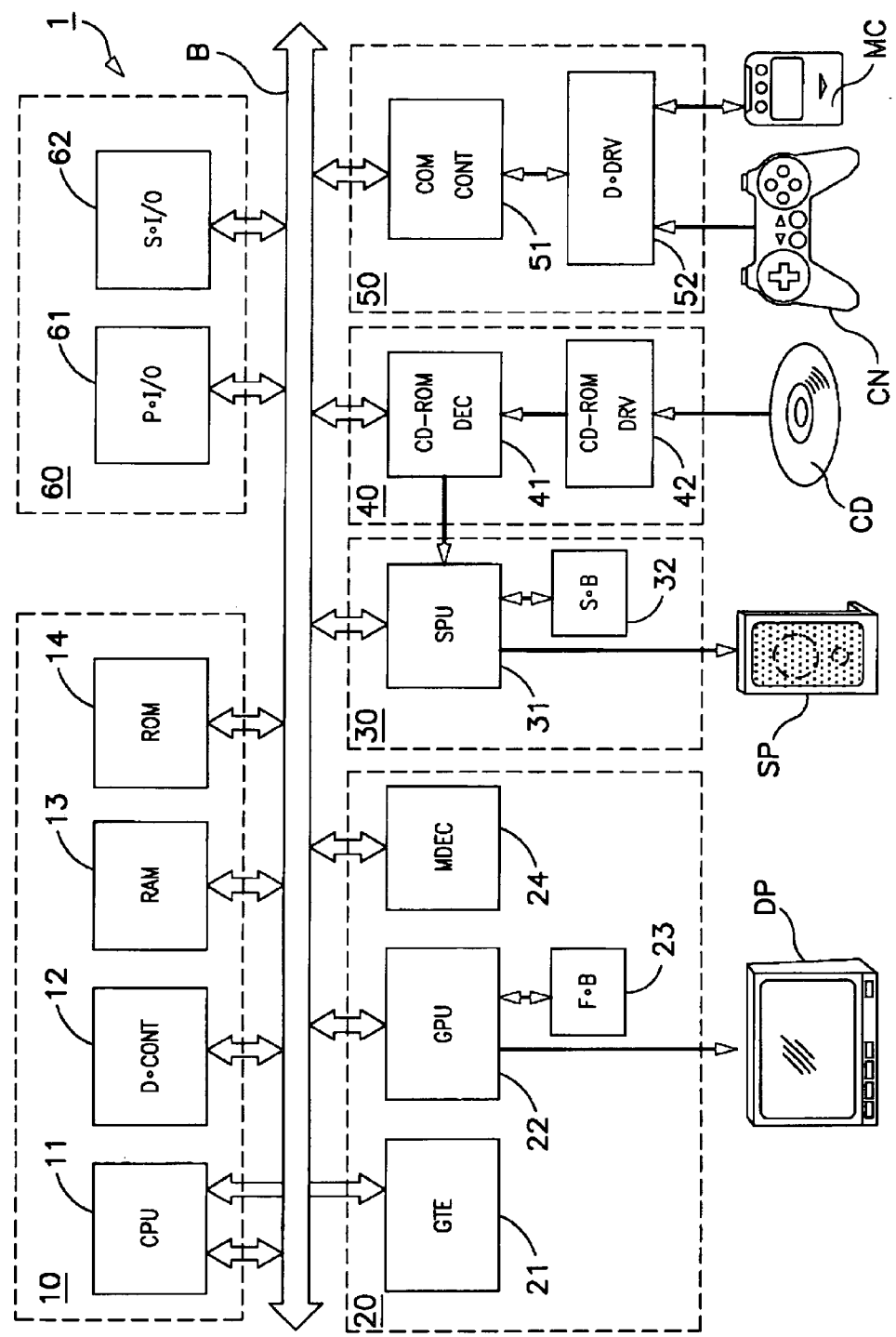
FIG. 1 is a configuration figure of a game device main body to achieve a game system according to the present invention.

Hereinafter, an embodiment of the present invention will be explained referring to the drawings.

In this embodiment, an example such a case that the game system which includes a game device main body which is one kind of the computer, a record medium according to the present invention on which a readable game program by the game device main body 1 is recorded, and a memory card device on which various data is recorded, and can selectively execute two or more kinds of games by cooperating and executing a game program recorded on the record medium and only data, or, an operating system of main body of game concerned device (Operating System: hereafter, called as an "OS"), and other program codes in the device, will be explained.

An exchangeable portable disk CD-ROM (Compact Disk Read Only Memory) and a DVD (Digital Video Disk), etc. may be used as an example of the record medium. The memory card device will be described later.

[Game Device Main Body]

First, the game device main body to achieve a game system according to the present invention will be explained. The video game device described, for example, in Japanese Patent Application KOKAI Publication No. 8-212377 can be uses as this game device main body 1.

A specific example of the configuration of the game device main body 1 according to the embodiment is shown in FIG. 1. That is, the game device main body 1 is constructed by including a main controller 10, an image processing section 20, an acoustic processing section 30, a disk controller 40, a communication controller 50, an I/O port part 60, and a main bus B to connect each of above-mentioned parts 10 to 60 with two-way communications.

The main controller 10 is constructed by including a CPU (Central Processing Unit) 11, a peripheral device controller (D•CONT) 12, which performs an interruption control and a DMA (Direct Memory Access) transfer control, etc. a RAM (Random Access Memory) 13, which temporarily records a game program and data and is used as a main memory, and a ROM (Read Only Memory) 14, which stores OS etc., which perform generalized management and control of each device. The CPU 11 is a RISC-CPU (reduced instruction set computer-CPU), and achieves various functions as described later based on the OS stored on ROM 14 and the game program stored on RAM 13, etc.

The image processing section 20 comprises a geometry transfer engine (GTE) 21, which performs a conversion of coordinates of the data to be displayed etc. at a high speed, a graphics processing unit (GPU) 22, which performs a drawing processing of the game image, which consists of the combinations of a polygon and a sprite (polygon, which includes a triangular and a quadrangle, etc.), etc. based on a drawing instruction from the CPU 11, a frame buffer (F•B) 23, which temporarily stores the game image to which the drawing processing is performed by the GPU 22, and an image decoder (MDEC) 24, which performs a decode processing of the image data if necessary. The image data, which is decoded by the image decoder 24 and is stored on the frame buffer 23, is read out and is displayed on the display unit DP.

The image, which includes a moving image element, can be displayed on the display unit DP by continuously performing the above-mentioned drawing processing by the GPU 22 and a storage to the frame buffer 23.

The acoustic processing section 30 includes a sound reproduction processing processor (SPU) 31 which performs a sound reproduction based on the sound data, and a sound buffer (S•B) 32 to temporarily store the reproduced data. The data stored on this sound buffer 32 is output to a speaker SP.

The disk controller 40 is constructed by including a disk drive device (CD-ROM DRV) 42 to reproduce, for example, the content recorded on the CD-ROM for the game to be recognized by the CPU 11 (Hereinafter, the reproduced data is called as a "reproduction data"), and a CD-ROM decoder (CD-ROM DEC) 41 to decode an error correction code (ECC) when the error correction code (ECC) is added to the reproduction data. The disk drive device 41 usually comprises a buffer (which is not shown in the figure) temporarily recording the reproduction data before storing the reproduction data on the RAM 13.

The CD-ROM decoder 41 also constructs a part of the acoustic processing section 30, and the data, which concerns the sound of the output data of the CD-ROM decoder 41, is input to the SPU 31.

The communication controller 50 comprises a communication controller (COMCONT) 51, which performs a communication control between the CPU 11 through the main bus B, a game controller CN which accepts an instruction from the player, a memory card device MC, and a device driver (D•DRV) 52, which becomes an interface to the communication controller 51. A game controller CN is an interface component to direct an intention of the player. The data directed through this game controller CN is transmitted to the communication controller 51 by a synchronous communication.

The communication controller 51 transmits the data, which shows the content of the instruction sent from the game controller CN and the memory card device MC to the CPU 11. Thereby, the intention of the player is informed to the CPU 11, and the CPU 11 becomes possible to perform a processing according to the intention of the player based on the executed game program. The communication controller 51 also has a function to record the data to the memory card device MC and read the recorded data based on the instruction from the CPU 11.

The memory card device MC is separated from the main bus B and connected thereto, and a power supply terminal of the connection connector thereof is formed usually longer than a data terminal. In addition, the memory card device MC comprises a power supply section internally as described later. Therefore, it is possible to attach and detach the memory card device MC in a state of turning on the power supply of the game device main body 1.

Each port of the parallel I/O (I/O) 61 and the serial I/O (I/O) 62 connects an acoustic processing device and the external information processing device directly or through the network, and takes electronic data from each connected device. In a word, the present invention can be executed by using not only the CD-ROM fitted in disk controller 40 but also the electronic data sent from an external device.

[Memory Card Device]

Next, the memory card device MC used in the embodiment will be explained in detail.

The memory card device MC is usually set in a card insertion section provided to a slot (not shown in the figure) of the game device main body 1, and is used as peculiar data record means corresponding to each of a plurality of game controllers CN. For example, when the two players play the game, each of game execution results etc. is recorded on the two memory card devices MC, respectively.

An outside shape of the memory card device MC and a fitting mechanism to the card insertion section can be referred to Japanese Patent Application KOKAI Publication NO. 11-7504.

The memory card device MC according to the embodiment is constructed by storing an fitting mechanism to the game device main body 1, the operation mechanism with the player and various electronic components into a case 80 having the shape detachably fitted to the card insertion section of the game device main body 1.

Figure 2:
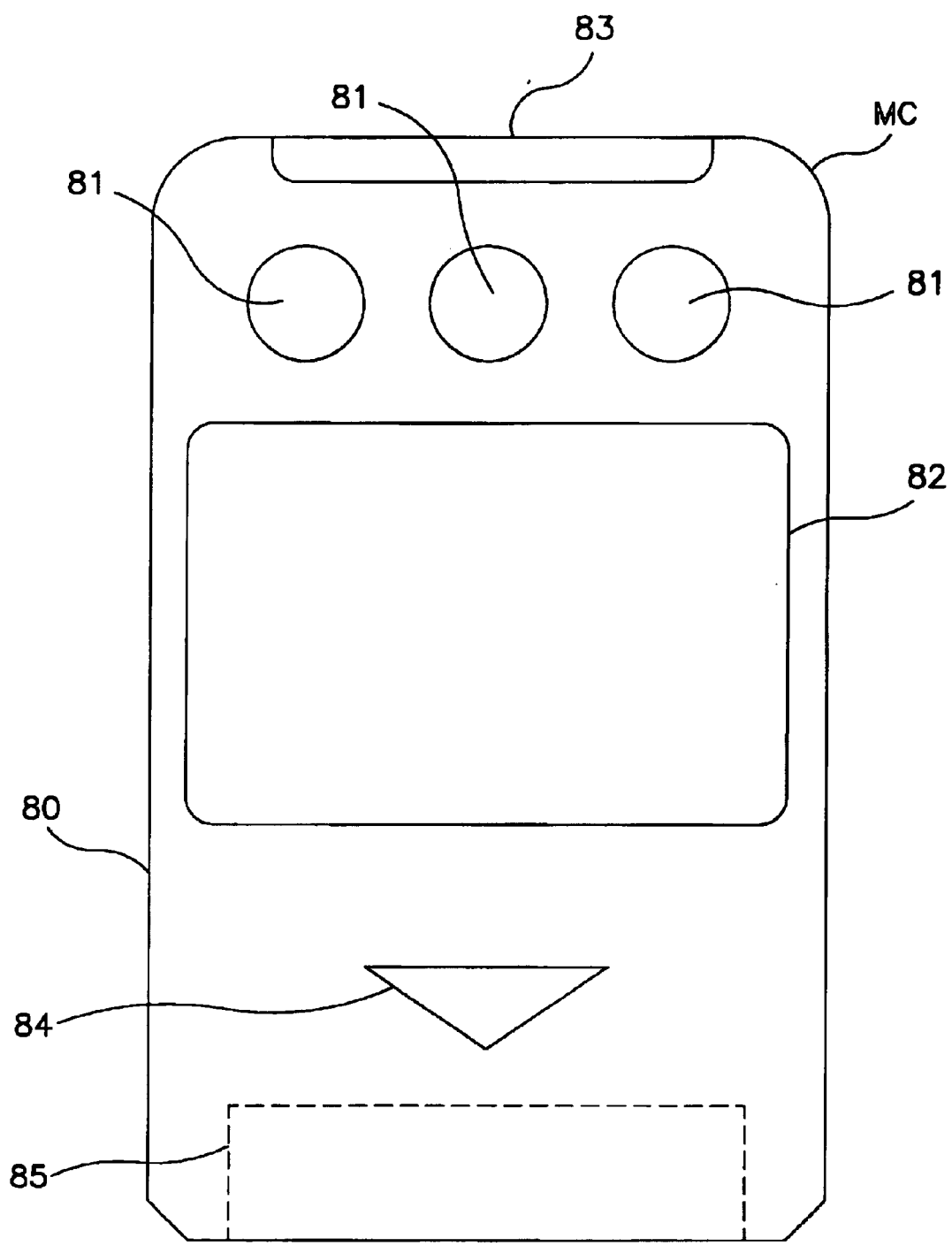
FIG. 2 is a front view of a memory card device according to the embodiment.

FIG. 2 is an outline view of this case 80. A button window 81, a display window 82, a communication window 83, and a guide 84 to direct a direction of the fitting are formed on the case 80 as shown in FIG. 2. A connection connector 85, which is conductive to an internal contact of the card insertion section when fitting it in the card insertion section of the game device main body 1, is provided to an opposite side of the communication window 83. A power supply terminal, a data terminal, and a control signal terminal are provided to this connection connector 85 by the predetermined arrangement.

Figure 3:
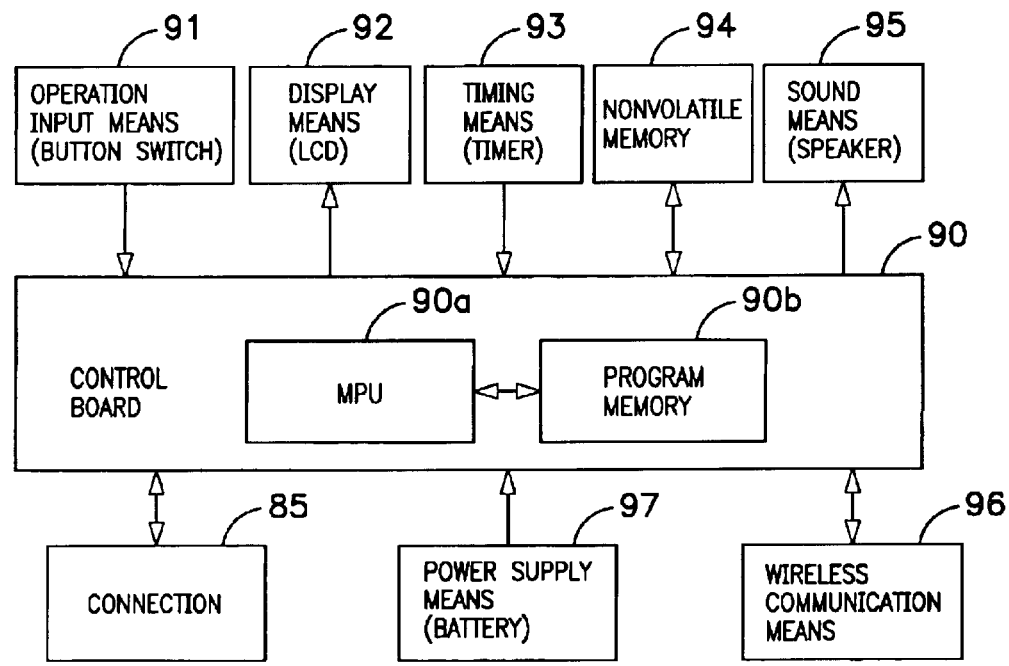
FIG. 3 is a connection configuration figure of the electronic component accommodated by the memory card device.

A configuration of electronic components accommodated in the case 80 is as shown in FIG. 3.

That is, an operation input section 91 such as button switches, a display section 92 which consists of a liquid crystal display (LCD) etc., a timing section 93 which consists of a timer, a nonvolatile memory 94 which consists of a semiconductor memory device like a flash memory, a pronunciation section 95 which consists of a speaker, a wireless communication section 96 to perform an infrared communication etc., and a power supply section 97 which consists of a battery are connected to the control board 90.

A microprocessor unit (MPU) 90a similar to the CPU 11 of the game device main body 1, and a program memory 90b which records a program, which is read out and executed by the MPU 90a, are fitted in the control board 90. Since the program recorded on the program memory 90b can be made arbitrarily, the programming section, which can define the processing at the memory card device MC exclusively, can be constructed by getting away from the game program which operates on the game device main body 1.

The operation input section 91 inputs a processing instruction from the player based on the game program and the data stored on the program memory 90b. A facility of the operation is given to the player by exposing a part of a button switch, which is the operation part from the button window 81 of the above-mentioned case 80.

In addition, the player can easily check the processing result by the control board 90 visually from the outside by exposing the display surface of the display section 92 from the display window 82. The pronunciation section 95 pronounces from the speaker based on the sound data generated by the execution process of the program by the control board 90.

Thus, since operation input section 91 to operate the program executed in its own device, the display section 92, and the pronunciation section 95 are comprised, it becomes possible to solely apply it as a portable game device, for example, by recording the exclusive game application on the control board 90 and starting and executing this at any time.

Timing section 93 is used to share the time data treated with the memory card device MC with the time treated with the game device main body 1. By using the timing section 93, not only each of the time data of the memory card device MC and the game device main body 1 is coincide each other but also the data to control the game which progresses independently in each device in real time can be shared.

The wireless communication section 96 transmits and receives data by infrared rays etc. between other similar kinds of memory card devices and information processing devices. The antenna (or, sensor), which becomes a communication interface, is arranged internally in the above-mentioned communication window 83.

Since the memory card device MC incorporates the power supply section 97, the operation can be continued, even if the memory card device MC is extracted while the game device main body 1 is operating. The memory card device MC can be operated alone by being separated from the game device main body 1. The power supply section 97, which can be charged, may be used. On contrast, the memory card device MC can be operated while it is inserted in the slot of the game device main body 1. In this case, the memory card device MC can be constructed so that the power supply is supplied from the game device main body 1.

Figure 4:
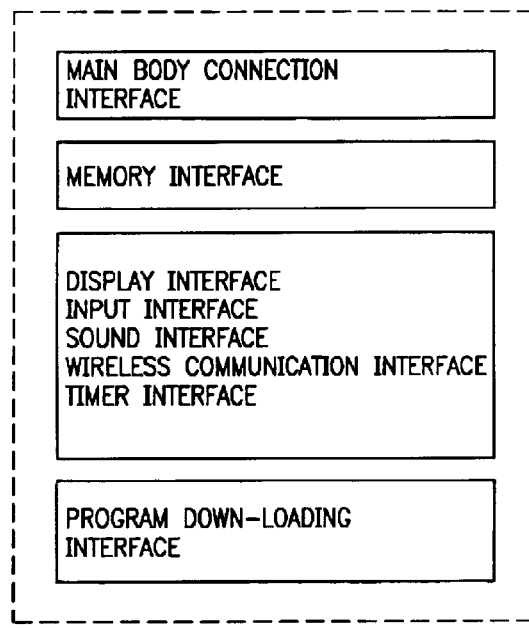
FIG. 4 is an interface explanation figure, which shows control items in the memory card device.

FIG. 4 is figure, which shows the content of the interface formed in the control board 90. That is, the control board 90 comprises a main body connection interface to connect it with the game device main body 1 which becomes an external information processing device seen from the memory card device MC, a memory interface which inputs data to record on the nonvolatile memory 94 and outputs data read from the nonvolatile memory 94, a display interface to display data on the display section 92, an input interface to input data from the operation input section 91, a sound interface to output the sound data to the pronunciation section 95, a wireless communication interface which communicates various data between the wireless communication section 96, and a timer interface which communicates time data between the timing section 93.

The control board 90 has the program downloading interface to down-load the program from the game device main body 1 etc. to the program memory section 90b through the connection connector 85. By using this program down-loading interface, it becomes possible to change an application program and various driver softwares, which operate on the memory card device MC from the outside easily.

As described above, since in the memory card device MC, the control board 90 has various interfaces to manage the newly added function, besides the main body connection interface and the memory interface in which the conventional memory card device should be comprised in the conventional memory card device disclosed in Japanese Patent Application KOKAI Publication No. 11-7504, an interchangeability with the function of a conventional general memory card device can be performed.

As mentioned above, since the operation of its own device can be controlled independently from the game device main body 1, a cooperative operation (link) of the memory card device MC and the game device main body 1 becomes possible by communicating the result of the game independently executed on the memory card device MC side to the main bodies 1 of the game device.

Figure 5:
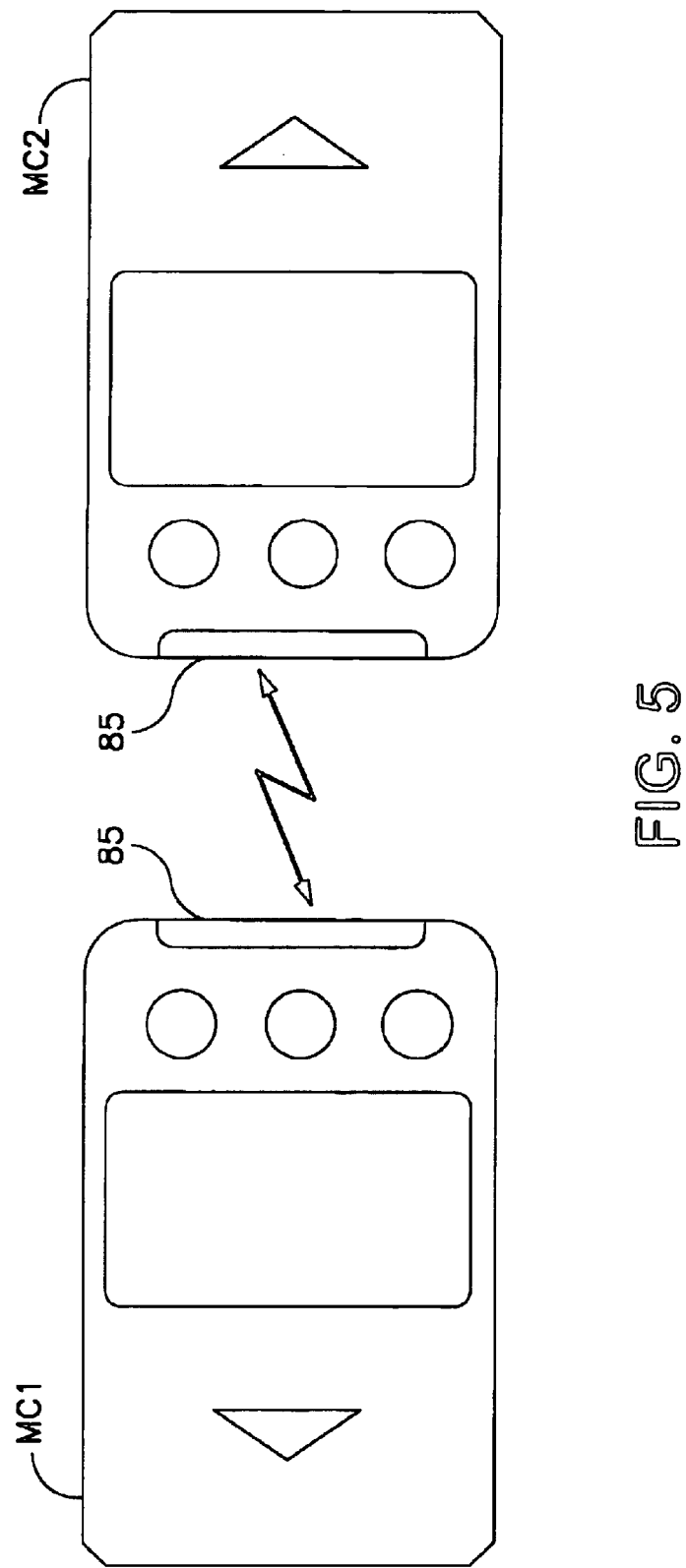
FIG. 5 is an explanation figure, which shows an appearance, which performs a data communication by the memory card device according to the embodiment.

The memory card device MC can perform a bidirectional data communication to and from the similar kind of the memory card device. This data communication is performed by opposing each wireless communication section 96 of a pair of the memory card devices MC1 and MC2 as shown in FIG. 5.

Thus, it becomes possible to mutually communicate various data recorded thereon by performing the data communication between the memory card devices MC1 and MC2.

[Operation of Game System]

The operation of the game system with the game device main body 1 and the memory card device MC, which are constructed as mentioned above, will be explained.

In the game device main body 1, when the power supply turning on processing or the reset processing is performed in a state of fitting the portable disk CD, to which the game program and other program codes are recorded on the disk drive device 42, the CPU 11 executes the OS which is recorded on the ROM 14.

When the OS is executed, the CPU 11 performs an initialization of the entire device such as the operation confirmation, controls the disk controller 40, and reads the game program etc. recorded on the portable disk CD to the RAM 13 and executes it. When the saved data is recorded on the fitted memory card device MC, this saved data is also read to the RAM 13.

The CPU 11 constructs the environment (game environment), which the player can play, on the game device main body 1 and achieves the game system according to the present invention by the execution of this game program etc.

The game executed by the game system of the embodiment provides the pseudovalue corresponding to the result of the execution to the player. The player can arbitrarily use the pseudovalue during the execution of the game. More generally, the pseudomoney to buy goods etc. in the game, the point which quantifies superiority or inferiority of the technique, in addition, the acquisition condition of the items is hardly damaged from the player character, which can be operated with the player, the enemy character as much as possible, etc., can be used as the pseudovalue. This can be used as a "digital cash" when it is used as the pseudomoney.

When constructing the game environment, the main controller 10 (the CPU 11 which reads and executes the predetermined program on the ROM 14) converts the pseudovalue to appropriate ones according to the kind of the game. In a word, to adjust a difficulty of the games, which acquires the pseudovalue easily or hardly, the pseudovalue, which transcends the kind of the games, can be used by holding the parameter, which shows the standard of value at each the game, and converting the pseudovalue based on this parameter.

The pseudovalue usually is recorded on the nonvolatile memory 94 of the memory card device MC, but may be recorded on the game device main body 1 side temporarily. Though it is convenient to make the above-mentioned parameter a table in an internal memory etc. of the main controller 10, it may be recorded on the nonvolatile memory 94 of the memory card device MC.

After executing the game, a general execution procedure until the obtained pseudovalue is saved in the above-mentioned the game system the will be explained.

Figure 6:
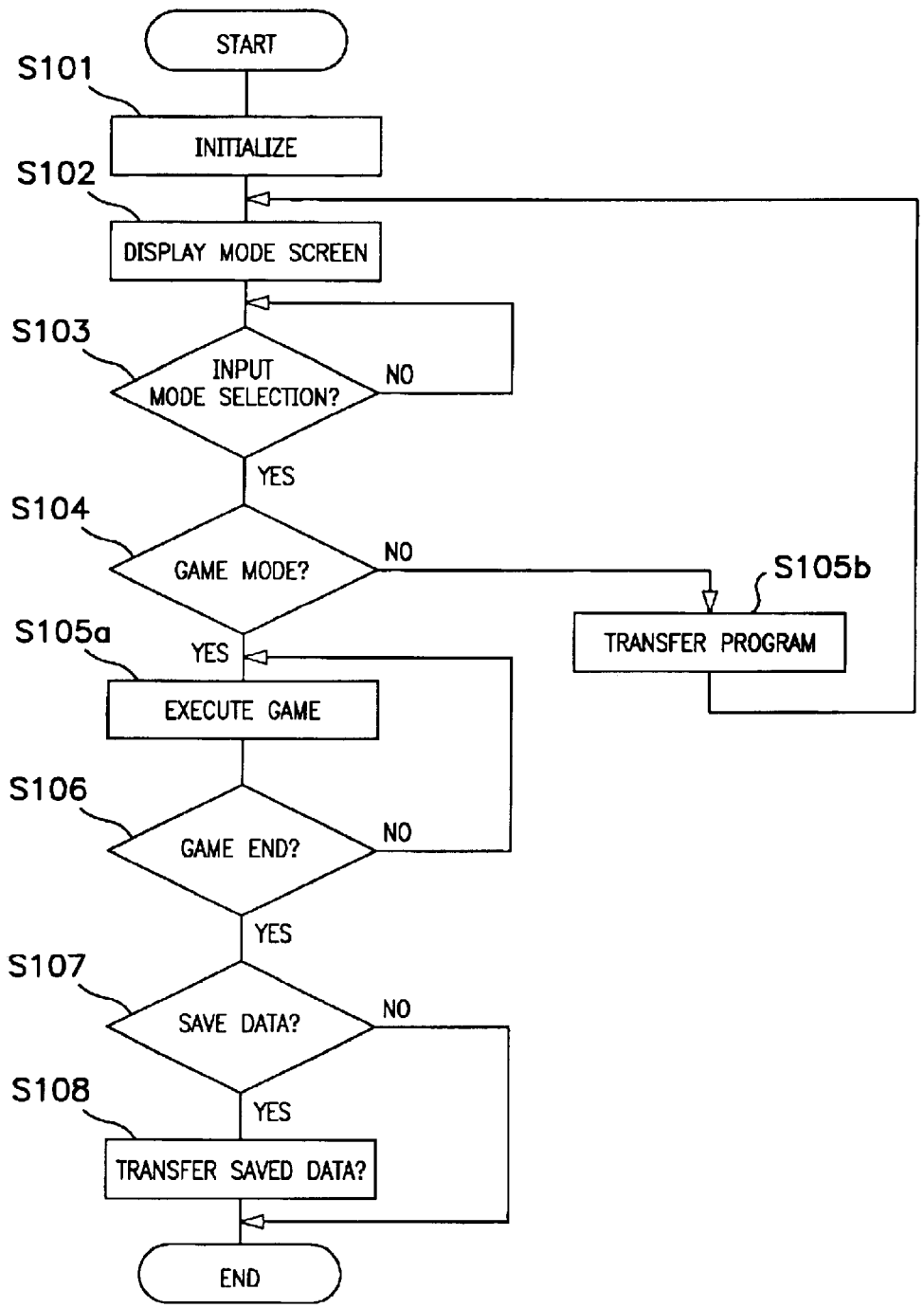
FIG. 6 is a figure to explain a procedure of a game processing according to the embodiment.

FIG. 6 is a figure a processing procedure of the main controller 10 (the CPU 11) in this case.

After performing an initialization, the main controller 10 displays a "mode screen" on the display unit DP in FIG. 6 (steps S101 and S102). The environment to execute the game is constructed on the game device main body 1 when the player directs "MODE SELECTION" according to the content of the display of the mode screen, in addition, "GAME MODE" is selected (YES in step S103, YES in S104, and S105a). When a "mode selection" is directed but "GAME MODE" is not selected (NO in step S104 and S105b), the program for the corresponding mode is transferred to the RAM 11 and the procedure is returned to step S102.

When the player interrupts or ends the game after executing the game, "GAME END" is directed. At this time, when a "data saving" is directed from the player as a result of the game execution, a necessary file is saved on the memory card device MC through the communication controller 50 and the processing is ended (YES in step S106, YES in S107, and S108). When a "data saving" is not directed, the processing is ended as it is.

Here, the saved file (saved data) is generally used to reproduce the game execution environment at the time of the end of the game, which includes the pseudovalue obtained as the result of the execution of the game, and the corresponding game is continuously executed by using the pseudovalue when the pseudovalue is read on the main controller 10.

The saved data includes a level and a stage, to which the player reaches as a result of executing the game, the data which shows a history of the game execution, and the pseudovalue obtained by executing the game. When the character, which is operated by the player, and the parameter, which indicates the characteristic of the game character, in which the operation procedure is defined by the main controller 10, is generated, they are also included. However, it is not necessary to do always like this, and the saved data may be selected according to the usage.

Figure 7:
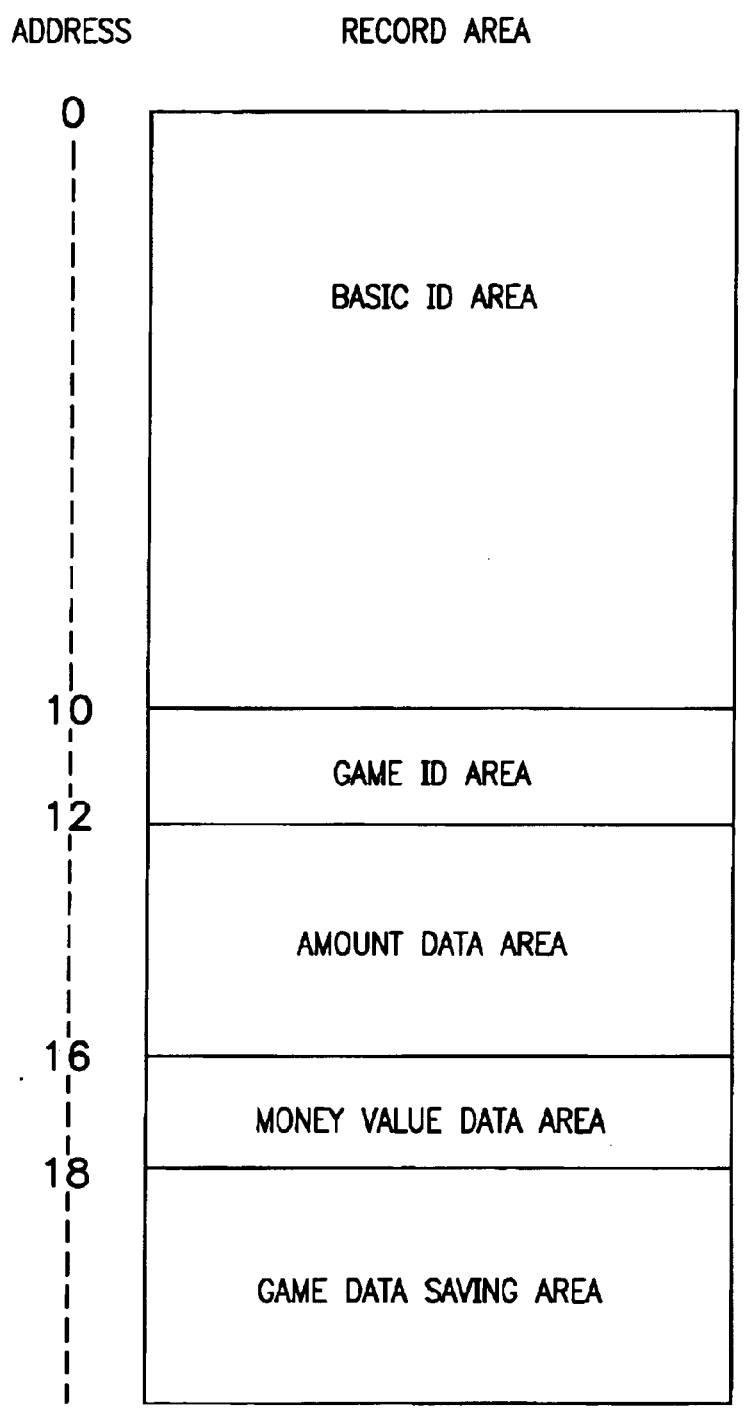
FIG. 7 is a conceptual diagram, which shows an example of a memory address in the memory card device.

FIG. 7 is a conceptual diagram, which shows an example of formatting the nonvolatile memory 94 of the memory card device MC.

The file address corresponding to the above-mentioned saved data is also recorded by such a format. The recorded specific data can be specified by using the address where a sequential number is subscribed from start to end as shown in the figure. Addresses of 0 to 9 are basic ID areas (ID is an abbreviation of Identifier. Hereinafter, it is the same as follows), addresses of 10 to 11 are the game ID areas, addresses of 12 to 15 are amount data areas, addresses of 16 to 17 are money value data areas, and addresses of 18 to highest address are the game data saving areas.

An extension ID to identify the content of the option, a production ID to identify the content of the game, besides the basic ID to identify the memory card device MC are recorded on the basic ID area. The corresponding file can be easily selected according to the data recorded on this basic ID area.

The game ID to identify the game is recorded on the game ID area. The amount data area is an area to record the amount data when it assumes to be money, which becomes an example of the pseudovalue, for instance, the memory card device MC to be an electronic purse. The money value data area is an area prepared when the parameter, which shows a relative standard of value of the pseudovalue on the memory card device MC side, is recorded. Specifically, the realization rate between each game at the data transfer is recorded in this area. The difference of the money rate among different kinds of the games is abolished by using such a parameter.

The format shown in FIG. 7 is defined at each the game. In the memory card device MC according to the embodiment, it becomes possible to save the execution result of the plurality of games, and actually, the set of the formats shown in FIG. 7 is provided according to the number of games.

[Operation Example of Game System]

In the embodiment, the pseudovalue treated in the game can be exchanged between other the players as well as the money and other properties used in an actual society. For example, when the pseudovalue is positioned as the amount data, which can be used in the game, that is, "DIGITAL CASH" and the digital cash can be used in the games other than the game, which acquires it by mediating the memory card device MC. In this case, the delivery of the digital cash may be performed between the game device main body 1 and the memory card devices MC fitted thereto, and may be performed only between the memory card devices MC apart from the game.

Figure 8:
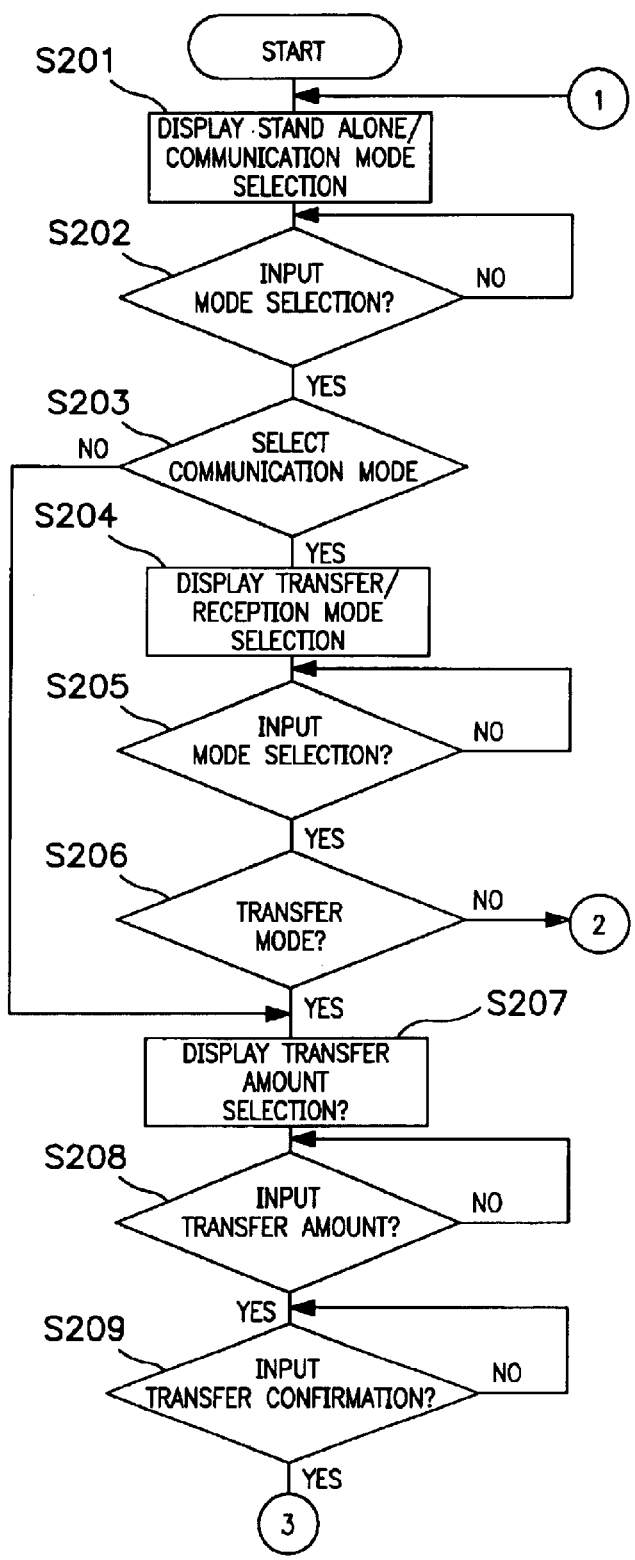
FIG. 8 is a figure to explain a processing procedure when transferring a digital cash, which becomes an example of the pseudovalue.
Figure 9:
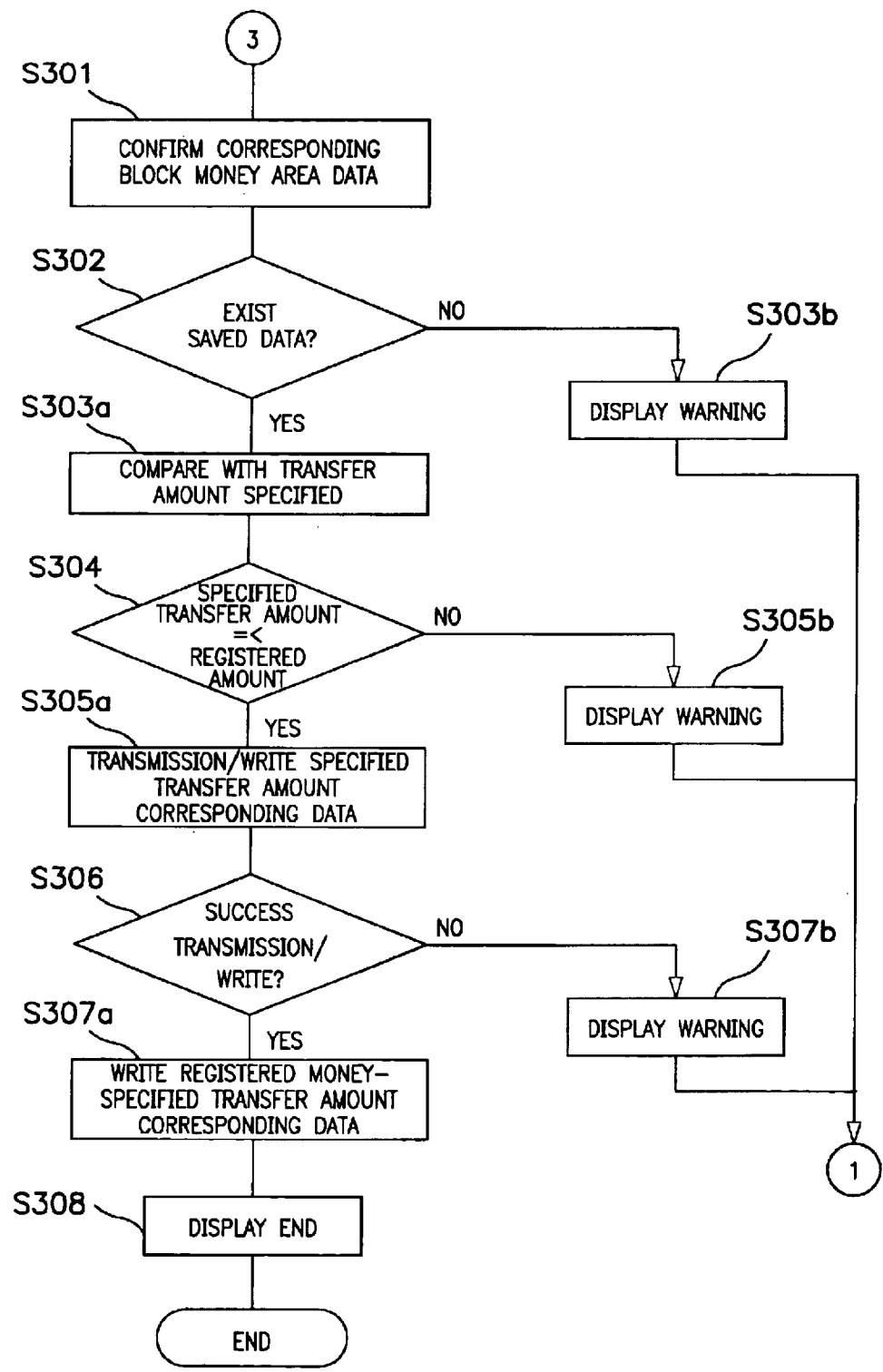
FIG. 9 is a figure to explain a following processing procedure of FIG. 8.
Figure 10:
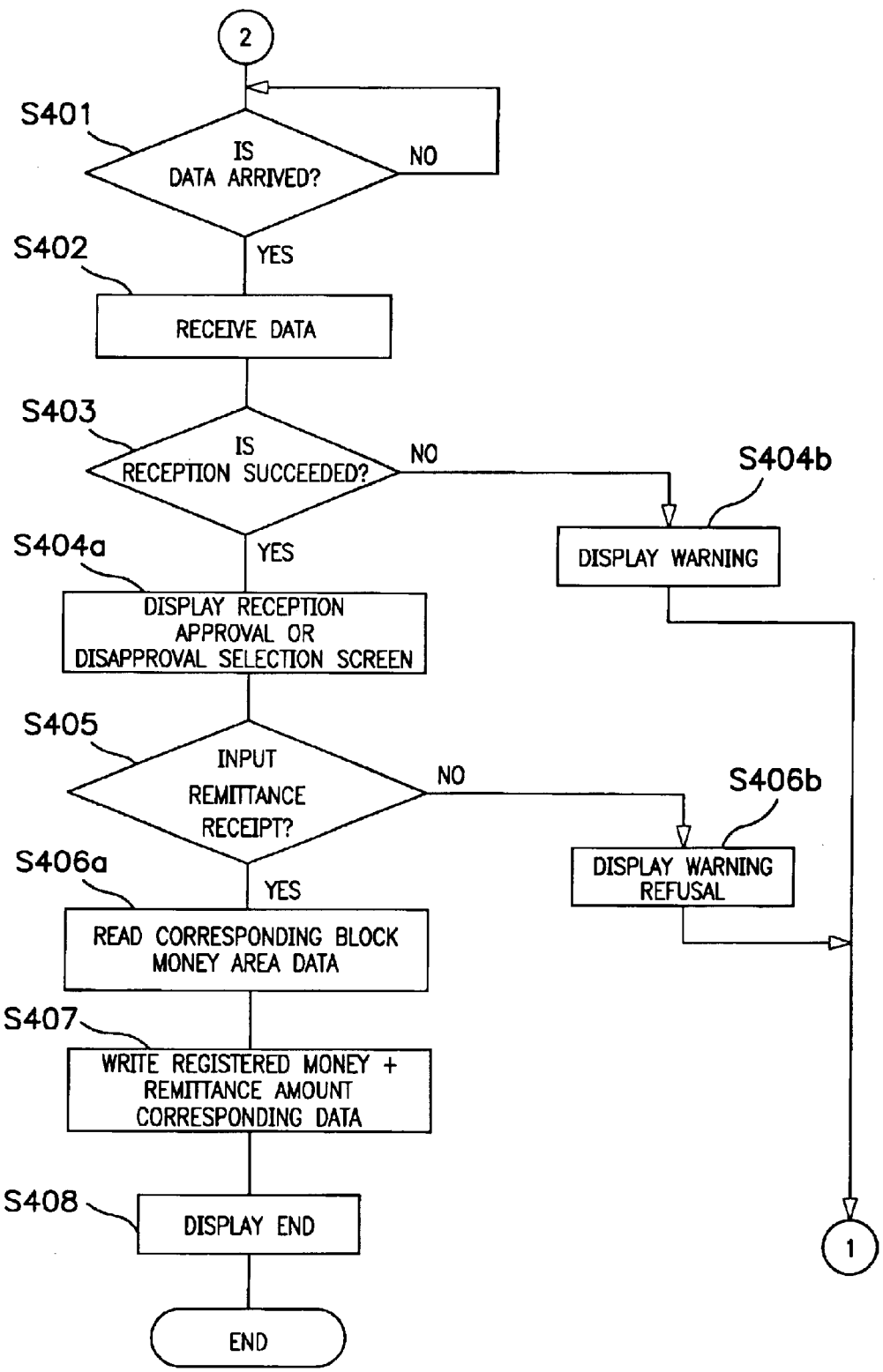
FIG. 10 is a figure to explain a processing procedure when performing a receipt processing of the above-mentioned digital cash.

FIG. 8 and FIG. 9 are figures, which show operation procedure when the digital cash is transmitted from a certain memory card device MC to another memory card device MC through the wireless communication, FIG. 10 shows an operation procedure when receiving the digital cash, and FIG. 11 is a figure showing the content displayed on the display window 82 of the memory card device MC in these cases.

Hereinafter, a processing, which transmits the digital cash from the memory card device MC, is assumed to be a "transfer processing" and a processing, which receives and stores the digital cash from other memory card devices MC, is assumed to be a "receipt processing", and an example, of which each memory card device MC performs these processing without the game device main body 1, will be explained.

[Transfer Processing]

Figure 11A:
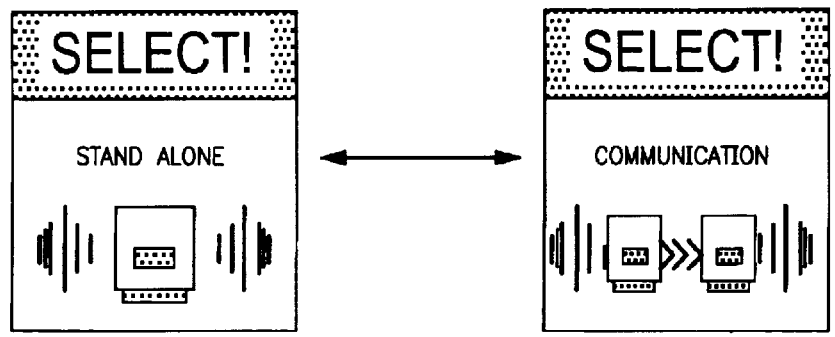
FIG. 11A to FIG. 11C are figures, which show an example of the images displayed on the display window of the memory card device when performing the transfer and the receipt of the digital cash.

Referring to FIG. 8, first, a selection screen of a "standalone/communication mode" is displayed on the display window 82 of the memory card device MC, which performs the transfer processing (step S201). FIG. 11A shows an example of this selection screen, and the image of "STANDALONE" and "COMMUNICATION" pushes the button switch in button window 81 and the change is displayed alternately. "STANDALONE: standalone mode" is a mode for transfer of the digital cash between data areas of its own memory card device MC. "COMMUNICATION: communication mode" is a mode for transfer of the digital cash to other memory card devices by the wireless communication.

The "STANDALONE" is selected such that a plurality of record areas of the data for each the game are prepared on the nonvolatile memory 94 of the device, for examples, and a part of the pseudovalue recorded in a certain record area is moved to another record area.

Figure 11B:
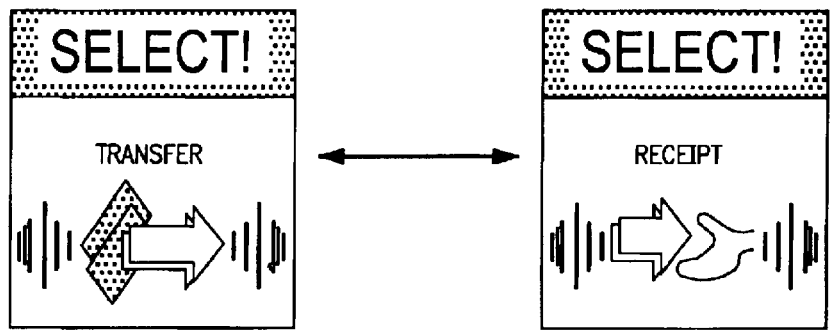

When the "communication mode" is directed by the player, the selection screen of a "transfer/receipt mode" is displayed (YES in step S202, YES in S203, and S204). FIG. 11B shows an example of the selection screen of this "transfer/receipt mode".

Figure 11C:
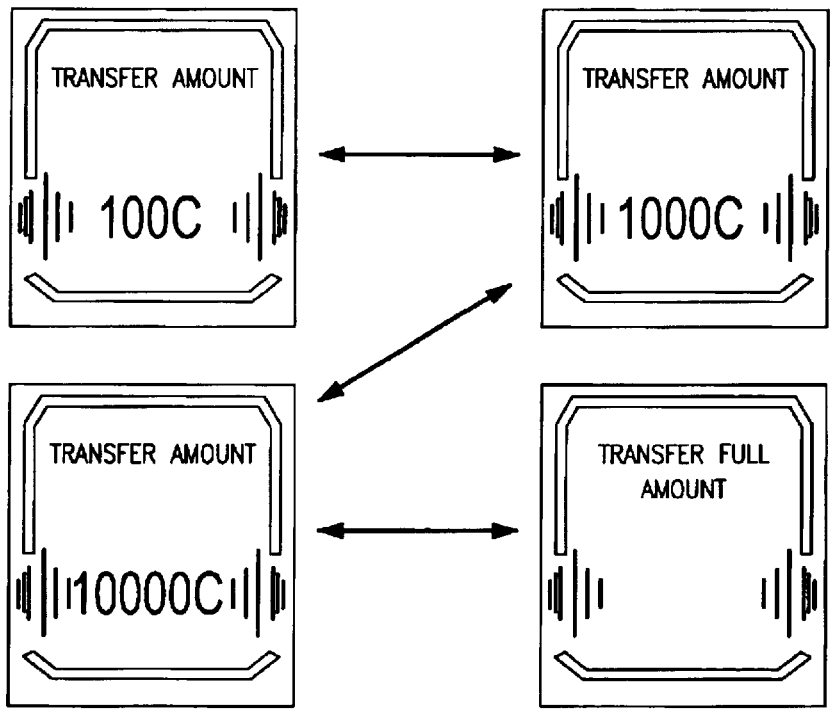

A "transfer amount selection" is displayed on the screen when the player directs "TRANSFER: transfer mode" from the selection screen of the "transfer/receipt mode" regardless of the standalone/communication mode (YES in step S205, YES in S206, and S207). FIG. 11C is an example of the screen of this "transfer amount selection", and one of "TRANSFER AMOUNT 100G (transfer amount)", "TRANSFER AMOUNT 1000G (transfer amount)", "TRANSFER AMOUNT 10000G (transfer amount)", "TRANSFER FULL AMOUNT (full amount of transfer)" can be selected. In a word, not only all of the digital cash, which is held by its own device, but also a part thereof can be transmitted. "G" of 100G to 10000G is a unit of the money of the digital cash, and the standard of value is decided depending on the above-mentioned parameter.

When the player decides "TRANSFER AMOUNT" and directs the input of the "transfer confirmation" according to the screen display, a procedure shifts to a procedure of FIG. 9. That is, a confirmation processing of a "corresponding block money area data" is executed (YES in step S208, YES in S209, and S301).

Thereafter, whether the "saved data" with a possibility that the digital cash of the amount, which corresponds to the transfer amount is registered, is recorded on the corresponding block money area data is confirmed (step S302). The amount (specified transfer amount), which should be transferred is compared with the amount of the registered digital cash (registered amount), when the saved data is recorded (YES in step S302 and S303*a*). "WARNING" is displayed and the procedure is returned to step S201 when there is no "Saved data" (N0 in step S302 and S303*b*).

When "SPECIFIED TRANSFER AMOUNT≦REGISTERED AMOUNT" is confirmed, "SPECIFIED TRANSFER AMOUNT EQUIVALENT DATA" is transmitted to the other party side memory card device, and the write confirmation is performed (YES in step S304 and S305*a*). The "WARNING" is displayed and the procedure is returned to step S201 when "SPECIFIED TRANSFER AMOUNT>REGISTERED AMOUNT" is confirmed in step S304 (N0 in step S304 and S305*b*).

When a success of the "transmission/write" on the other party side memory card device is confirmed, the corresponding data of "REGISTERED AMOUNT−SPECIFIED TRANSFER AMOUNT" in its own device is written. When the success of "transmission/write" is not confirmed, "WARNING" is displayed and the procedure is returned to step S201 (N0 in step S306 and S307*b*).

When a write in its own device is normally ended, "END" is displayed and the transfer processing is ended (step S308).

[Receipt Processing]

The memory card device MC, which receives the specified transfer amount from other memory card devices through the communication, the receipt processing of the specified transfer amount is performed according to the procedure of FIG. 10.

That is, when the "data arrival" is confirmed, the data, which corresponds to the specified transfer amount is received (YES in step S401 and S402). When the reception is succeeded, the selection screen of "RECEPTION APPROVAL OR DISAPPROVAL" is displayed, and the remittance receipt with the player is confirmed (YES in step S403 and S404*a*). The "WARNING" is output and the procedure is returned to step S201 when failing in the reception (NO in step S403 and S404*b*).

When the intention of the "remittance receipt" is confirmed from the player, the "corresponding money block area" is specified, the data (registered amount) recorded in the corresponding area is read and the registered amount and the remitted amount (remittance amount) is added. Then, the data corresponding to the total amount is rewritten to the corresponding area (YES in step S405, S406*a*, and S407). In the case that this rewrite normally ends, "END" is displayed and the receipt processing is ended (step S408).

A "receipt refusal" is displayed and the procedure is returned to step S201 when the intention of the "remittance receipt" is not confirmed in step S405 (NO in step S405 and S406*b*).

Thus, by performing an operation according to the instruction of the selection screen display displayed on the display window 82 of the memory card device MC, the delivery of the digital cash between the players can be easily performed.

After delivery of the digital cash is performed, and, as a result, the amount of the digital cash recorded on its own device is changed, by fitting each memory card device MC to the game device main body 1, the execution of the game, which uses the recorded the digital cash becomes possible. At this time, the parameter, which determines the standard of value of the digital cash, is read according to the kind of the game, which should be executed, and the pseudovalue is converted into the digital cash of the standard of value corresponding to the kind of the game based on this parameter. In a word, the "exchange" of the digital cash is performed.

Thus, according to the game system of this embodiment, it becomes possible to use the digital cash, which is acquired by the player by executing a certain game, in other games, since the pseudovalue for the game, for example, the digital cash in the memory card device MC is recorded according to the kind of the corresponding game, the recorded digital cash is read according to the kind of the game, which should be executed and the game is executed, and at least part of the pseudovalue for a certain game is converted into the digital cash with the corresponding amount of the standard of value for other kinds of games.

Since the memory card device MC, which can be operated independently from the game device main body 1, is used as a carrier medium of the digital cash treated between different games, furthermore, this memory card device MC is constructed to be able to perform the delivery of the digital cash between other similar kinds of devices to be operated independently from the game device main body 1, the exchange of digital cash becomes easy between different players with the same kind of memory card devices, or between the same players having a different memory card device. In a word, the digital cash system, which treats the digital cash, which can be used by the game space, can be easily constructed.

In addition, since the memory card device MC is programmable, the player can confirm the appearance of the processing of the internal through the display section 92, and the pronunciation section 95 pronounces the sound if necessary, it is possible to operate by itself as a game device and a use of the memory card device MC becomes possible, too.

In this embodiment, though a case of treating the pseudomoney, for example, represented by the digital cash as an example of the pseudovalue, for example, an acquisition point in the mah-jong game, an acquisition premium in the pachinko game and the video slot machine game and various items etc. acquired by the role-playing game etc. can be similarly treated as the pseudovalue.

Other record media except the memory card device MC, for example, an external memory of the game device main body 1, a hard disk drive of the external information processing device connected with the game device main body 1 in online, the usual memory card devices other than the memory card device MC of this embodiment etc. can be used to record the pseudovalue.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A game system comprising:
  game execution means to execute a game adapted to utilize a predetermined pseudovalue based on a game program;
  a memory card device, which records a pseudovalue obtained as a result of executing said game as a game data; and
  data reading means to extract said pseudovalue from said game data recorded on said memory card device and transmit said extracted pseudovalue to said game execution means, wherein
  said memory card device comprises:
  a record medium which is adapted to record the pseudovalue for each of a plurality of kinds of the game;
  communication means to communicate between another memory card device;
  control means having a first function and a second function, wherein said first function transmits a pseudovalue recorded on said record medium to another memory card device via said communication means and records a pseudovalue received from said other memory card device through said communication means on said record medium, and wherein said second function being to convert at least a part of a pseudovalue for a certain game recorded on said record medium into a pseudovalue for other kind of the game and to record the converted pseudovalue on the corresponding record medium; and
  said control means is adapted to selectively execute said first and second functions.

2. The game system according to claim 1, wherein said game execution means accesses a parameter indicative of a relative standard of value of the predetermined pseudovalue for each kind of the game, and can thereby convert said extracted pseudovalue to a pseudovalue adapted for use by said game system.

3. The game system according to claim 1, wherein said communication means performs a wireless communication to said other memory card device.

4. The game system according to claim 1, wherein said control means transmits a part of said plurality of datums recorded on said record medium corresponding to said game system to said other memory card device and subtracts a pseudovalue in the transmitted plurality of datums from said pseudovalue in the plurality of datums before transmission.

5. The game system according to claim 1, wherein said control means adds a pseudovalue in a plurality of datums received from said other memory card device to the pseudovalue in the plurality of datums recorded on the record medium.

6. A game system comprising:
  game execution means to execute a game adapted to utilize a predetermined pseudovalue based on a game program;
  a memory card device which records a saved data to reproduce a game execution environment at an end time of the game, said game execution environment including a pseudovalue obtained as a result of executing said game; and
  data reading means for reading and transmitting the saved data recorded on said memory card device to said game execution means, wherein
  said memory card device comprises:
  a record medium which is adapted to record the pseudovalue for each of a plurality of kinds of the game;
  communication means to communicate between another memory card device;
  control means having a first function and a second function, wherein said first function transmits a pseudovalue recorded on said record medium to another memory card device via said communication means and records a pseudovalue received from said other memory card device through said communication means on said record medium, and wherein said second function being to convert at least a part of a pseudovalue for a certain game recorded on said record medium into a pseudovalue for other kind of the game and to record the converted pseudovalue on the corresponding record medium; and
  said control means is adapted to selectively execute said first and second functions.

7. A game system comprising:
  game execution means to execute a game adapted to utilize a pseudovalue based on a game program recorded on a disk interchangeably mated thereto;
  a memory card device comprising a record medium, which can record the pseudovalue for a plurality of kinds of the game, can be interchangeably mated, and is adapted to record the pseudovalue obtained by executing the game based on the game program recorded on said disk in said record medium according to the kind of the game; and
  data reading means to read the pseudovalue recorded on said record medium of said memory card device according to the kind of the game to be executed and transmit it to said game execution means, wherein
  said memory card device comprises:
  a record medium which is adapted to record the pseudovalue for each of a plurality of kinds of the game;
  communication means to communicate between another memory card device;
  control means having a first function and a second function, wherein said first function transmits a pseudovalue recorded on said record medium to another memory card device via said communication means and records a pseudovalue received from said other memory card device through said communication means on said record medium, and wherein said second function being to convert at least a of a pseudovalue for a certain game recorded on said record medium into a pseudovalue for other kind of the game and to record the converted pseudovalue on the corresponding record medium; and said control means is adapted to selectively execute said first and second functions.

8. The game system according to claim 7, wherein said memory card device comprises an exclusive power supply section and a program means adapted to provide for processing of said memory card device.

9. A memory card device adapted to be interchangeably mated with a game system, comprising a game execution means to execute a game adapted to utilize a predetermined pseudovalue based on a game program, said memory card device comprising:

communication means to communicate between at least one similar kind of device;

a record medium to record data for each of a plurality of kinds of the game;

data record means to record a pseudovalue obtained as a result of an execution of said game when said memory card device is mated to said game system, on said record medium according to said at least one similar kind of the game; and control means having a first function and a second function, wherein said first function transmits a pseudovalue recorded on said record medium to another memory card device via said communication means and records a pseudovalue received from said other memory card device through said communication means on said record medium, and wherein said second function being to convert at least a part of a pseudovalue for a certain game recorded on said record medium into a pseudovalue for other kind of the game and to record the converted pseudovalue on the corresponding record medium; and said control means is adapted to selectively execute said first and second functions.

10. The memory card device according to claim 9, wherein said communication means performs a wireless communication with said at least one similar kind of device.

11. The memory card device according to claim 9, wherein said control means transmits a part of the pseudovalue recorded on said record medium corresponding to said game system to said at least one similar kind of device and subtracts a value of the transmitted pseudovalue from said pseudovalue.

12. The memory card device according to claim 9, wherein said control means adds the received pseudovalue to the recorded pseudovalue on said record medium.

13. The memory card device according to claim 9, further comprising program means which exclusives define a processing for its own device independently of said game system.

14. The memory card device according to claim 13, further comprising display means to visually display a content of said execution of the program by said program means.

15. The memory card device according to claim 13, further comprising means to output sound based on a sound data generated at executing the program by said program means.

16. A game execution method executed by a game system adapted to utilize a predetermined pseudovalue based on a game program, and a memory card device detachably mated to the game system, wherein said memory card device records a pseudovalue obtained as a result of executing said game for each of a plurality of kinds of the game, and said memory card device is adapted to communicate with another memory card device, the method comprising:

selectively performing steps of transmitting a pseudovalue recorded on said memory card device mated with said game system to said other memory card device, recording a pseudovalue received from said other memory card device on said memory card, and converting at least a part of a pseudovalue for a certain game recorded on said memory card device into a pseudovalue for another kind of the game and recording the converted pseudovalue on said memory card device; and reading a pseudovalue corresponding to a game to be executed from said memory card device by said game system, and executing said game by said game system.

17. The game execution method according to claim 16, wherein a parameter indicative of a relative standard of value of the predetermined pseudovalue of each of the at least one kinds of the game is held in said game system or said memory card device, and wherein said parameter is utilized to determine a standard of value of the pseudovalue on said game.

* * * * *

UNITED STATES PATENT AND TRADEMARK OFFICE
CERTIFICATE OF CORRECTION

PATENT NO. : 6,918,828 B2  Page 1 of 1
APPLICATION NO. : 09/752007
DATED : July 19, 2005
INVENTOR(S) : Kentaro Horikawa It is certified that error appears in the above-identified patent and that said Letters Patent is hereby corrected as shown below:

<u>Column 17,</u>
Line 2, after "at least a" insert -- part --.

Signed and Sealed this

Twenty-seventh Day of June, 2006

JON W. DUDAS
*Director of the United States Patent and Trademark Office*